US011662935B2

(12) United States Patent
Esposito et al.

(10) Patent No.: US 11,662,935 B2
(45) Date of Patent: May 30, 2023

(54) ADAPTIVE DATA RELOCATION FOR IMPROVED DATA MANAGEMENT FOR MEMORY

(71) Applicant: Micron Technology, Inc., Boise, ID (US)

(72) Inventors: Luigi Esposito, Naples (IT); Alberto Sassara, Naples (IT); Paolo Papa, Naples (IT); Massimo Iaculo, Caserta (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/400,935

(22) Filed: Aug. 12, 2021

(65) Prior Publication Data

US 2023/0048133 A1 Feb. 16, 2023

(51) Int. Cl.
*G06F 3/06* (2006.01)
(52) U.S. Cl.
CPC .......... *G06F 3/0649* (2013.01); *G06F 3/0604* (2013.01); *G06F 3/0646* (2013.01); *G06F 3/0679* (2013.01)

(58) Field of Classification Search
CPC ..... G06F 3/0649; G06F 3/0604; G06F 3/0646
See application file for complete search history.

(56) References Cited

U.S. PATENT DOCUMENTS

| 2020/0192809 A1* | 6/2020 | Mappouras | G06F 12/0261 |
| 2020/0257472 A1* | 8/2020 | Garcia | G06F 12/0284 |
| 2021/0133070 A1* | 5/2021 | Pletka | G06F 12/0246 |
| 2021/0248068 A1* | 8/2021 | Izen | G06F 3/0632 |

* cited by examiner

*Primary Examiner* — David Yi
*Assistant Examiner* — Nicholas A. Paperno
(74) *Attorney, Agent, or Firm* — Holland & Hart LLP

(57) ABSTRACT

Methods, systems, and devices for improved data management for memory are described. An apparatus may include a memory array including one or more blocks of memory cells. Data read from a block of memory cells may be written to a buffer, to support providing the data to a host system or modification of the data by the host system. If a quantity of read commands performed at the block of memory cells satisfies a threshold, the data may be written from the buffer to a different block of memory cells, rather than the block from which the data was previously read.

22 Claims, 5 Drawing Sheets

ADAPTIVE DATA RELOCATION FOR IMPROVED DATA MANAGEMENT FOR MEMORY

FIELD OF TECHNOLOGY

The following relates generally to one or more systems for memory and more specifically to improved data management for memory.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
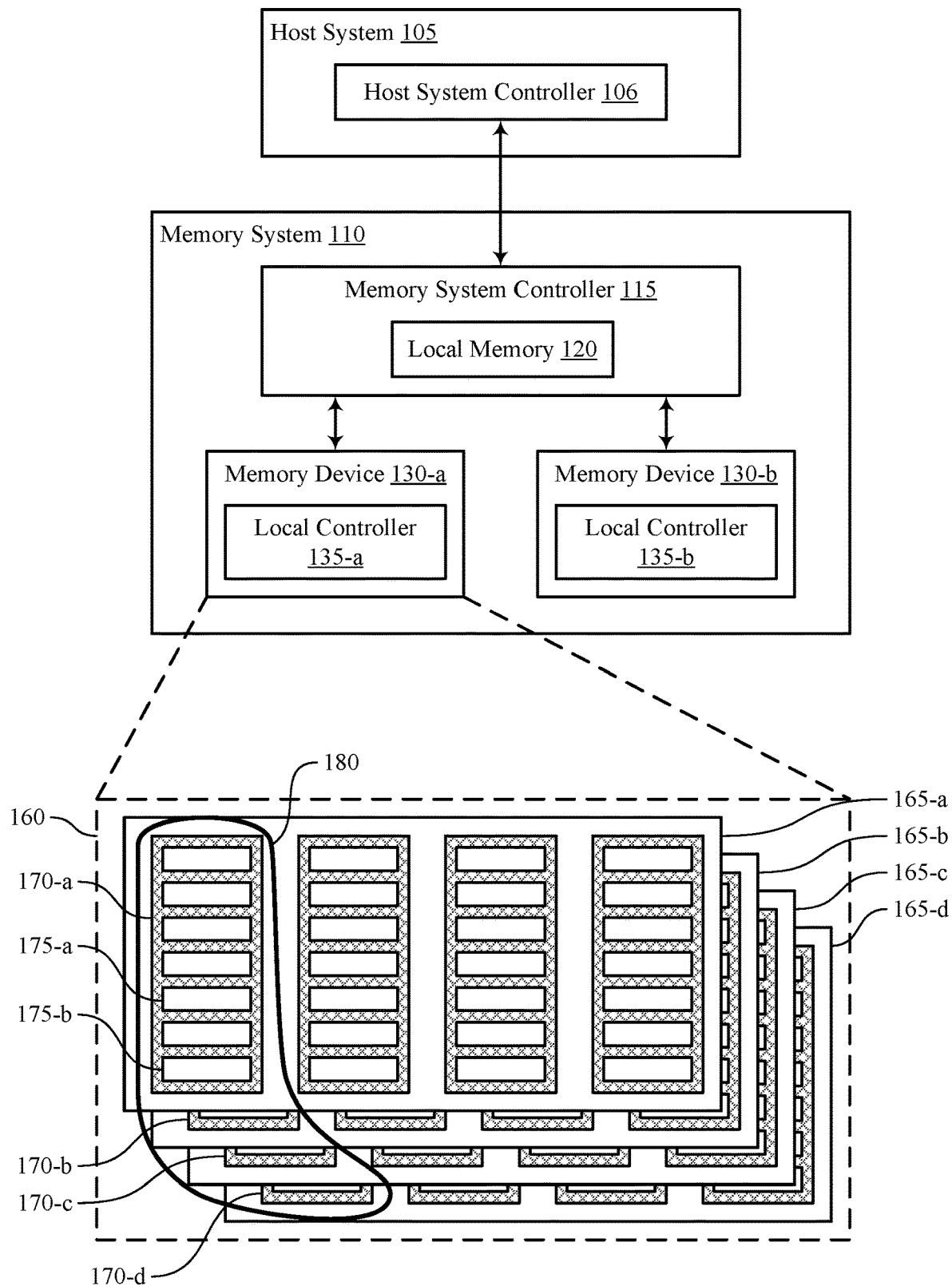
FIG. 1 illustrates an example of a system that supports improved data management for memory in accordance with examples as disclosed herein.

A memory system may be used to store data for a host system in an electronic system. In some examples, the host system may transmit read commands to retrieve data from the memory system. Some data stored at a memory system may be read more than other data stored at the memory system. Data that is read relatively more often may be referred to as hot data, and data that is read relatively less often may be referred to as cold data. Similarly, locations within the memory system that store hot data may be referred to as hot locations, and locations within the memory system that store cold data may be referred to as cold locations. For example, storage locations (e.g., groups of memory cells) within a memory system may be organized as pages, and some pages may be hot, while other pages may be cold.

In some cases, a likelihood of an error associated with a storage location (e.g., an error associated with storing data at the storage location or reading data from the storage location) may increase with a quantity of times data is read from the storage location. For example, memory cells may suffer wearout, fatigue, or other forms of degradation and thus may become less reliable the more times they are read from or otherwise utilized. Accordingly, absent mitigation techniques, a hot storage location may degrade faster or to a greater extent than a cold storage location. This may result in lower reliability for hot data or have other drawbacks.

Some memory systems may track (e.g., monitor) how many read operations (or other access operations) are performed on a group of memory cells and, if the quantity of read operations performed on the group satisfies a threshold value, the memory system may transfer all data stored within the group of memory cells to another group of memory cells. Read operations may, however, occur at a finer level of granularity than such tracking (e.g., to avoid excessive overhead associated with such tracking). For example, a memory array may be organized as a set of blocks, where each block includes multiple pages of memory cells, and such tracking may occur at a block level of granularity, while read operations may be performed on individual pages or other subsets (e.g., groups of pages) within a block. Thus, a group of memory cells for which a quantity of read operations reaches the threshold (e.g., a block of memory cells) may include both hot and cold data (e.g., both hot and cold pages), and relocating all data within the tracked group of memory cells may result in the transfer of both hot and cold data. Relocating the cold data along with the hot data may result in unnecessary latencies as well as unnecessary read and write operations, and unnecessary read and write operations may result in further degradations.

As described herein, a memory system may transfer the most recently read data to a second group of memory cells in response to a quantity of read operations for a first group of memory cells satisfying a threshold value, but in at least some cases may not transfer all data from the first group to the second group. For example, a set of data may be read from one or more pages within a first block of memory cells, and it may be determined that reading the set of data causes the quantity of read operations for the first block to satisfy the threshold value. The set of data may be transferred to a second block, while other data stored at the first block remains in the first block. For the example, as part of reading the set of data from the first block, the set of data may be stored in a buffer within the memory system, and in connection with the set of data being flushed (e.g., evicted) from the buffer, the set of data may be written to the second block (e.g., the version of the set of data that is written to the second block may become the new, valid copy of the set of data) based on the quantity of read operations for the first block satisfying the threshold value. In some cases, if the quantity of read operations for a block does not satisfy the threshold value after a set of data ahs been read from the block, the set of data may instead be evicted from the buffer at some later time (e.g., based on a cache policy according to which the buffer is operated), and no additional write operation may be performed (e.g., the set of data as previously read from the block may remain the valid copy of the set of data).

It may be more likely (e.g., on a statistical basis) that the data read from a block in connection with reaching the threshold quantity of read operations for the block is hot data, rather than cold data, and thus, over the course of memory system operation, techniques as described herein may result in hot data being relocated more often than cold data. Accordingly, aspects of the disclosure herein may provide wear leveling benefits, along with related reliability and longevity benefits. Additionally or alternatively, aspects of the disclosure herein may provide latency benefits, such as due to the relocated data having already been read into the buffer as part of the initial read operation, thus avoiding additional latency associated with reading that same data from the first block again for relocation purposes, along with additional wearout associated with reading that same data from the first block again for relocation purposes. Additionally or alternatively, aspects of the disclosure herein may result in hot data being separated from cold data, which may support improved media management (e.g., garbage collection) operations or provide other benefits. Additionally or alternatively, aspects of the disclosure herein may reduce write amplification due to avoiding unnecessary relocations of cold data. Additionally or alternatively, aspects of the disclosure herein may result in data being relocated in accordance with access patterns by a host system (e.g., in accordance with patterns or sequences according to which the host system reads different sets of data), which may reduce latencies associated with subsequent accesses of the relocated sets of data (e.g., by increasing a likelihood of subsequent read commands being associated with sequentially or otherwise contiguously or proximately stored sets of data).

In some examples, a threshold quantity of read operations for a block of memory cells whose satisfaction results in the most recently read data being transferred from one block to another block may be referred to as an early relocation threshold or first threshold value, and a threshold quantity of read operations whose satisfaction results in all data (or all valid data) being transferred from one block to another block may be referred to as a reliability threshold or second threshold value. Some memory systems as disclosed herein may employ both an early relocation threshold and a reliability threshold value. Other memory systems as disclosed herein may employ an early relocation threshold but not a reliability threshold value. In some examples, in connection with relocating a set of data from a first block to a second block based on an early relocation threshold value, a memory system may relocate one or more additional sets of data from the first block to the second block based on a logical or physical association between the set of data and the one or more additional sets of data (e.g., the one or more additional sets of data may be stored in memory cells sharing one or more physical structures with the memory cells storing the set of data, or the one or more additional sets of data may be associated with the set of data based on an access pattern by the host system that includes the set of data and the one or more additional sets of data, among other possibilities).

For a memory system that employs both an early relocation threshold value, the early relocation threshold may be lower than the reliability threshold in some cases. In some examples, the reliability threshold may be static (e.g., configured at a fixed value). Regardless of whether a memory system also employs a reliability threshold value, an early relocation threshold may be ether static or dynamic (e.g., adjustable during memory system operation or as part of memory system). For example, a memory system that employs a dynamic early relocation threshold may adjust the early relocation threshold based on a level of logical saturation of the memory system or a memory array therein, based on a duration of time since a garbage collection, wear leveling, or other media management operation has been performed or a duration of time until such an operation will be performed, or any combination thereof.

Features of the disclosure are initially described in the context of systems, devices, and circuits with reference to FIG. 1. Features of the disclosure are described in the context of a memory system and process diagram with reference to FIGS. 2 and 3. These and other features of the disclosure are further illustrated by and described in the context of an apparatus diagram and flowchart that relate to improved data management for memory with reference to FIGS. 4 and 5. Although some examples may be described herein with respect to tracking the quantity of read operations performed on different blocks of memory cells, it is to be understood that the teachings herein may be applied to any groups of memory cells from which data may be read at a finer granularity (e.g., where individual read operations may be performed on one or more subsets of memory cells within the groups of memory cells for which the quantity of read operations is tracked).

FIG. 1 illustrates an example of a system 100 that supports improved data management for memory in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a buffer (e.g., cache) for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

In some examples, data may be read from a memory device 130 (e.g., in response to a read command from the host system 105), and the data may be written to the local memory 120 (e.g., to maintain low-latency access to the data in case the data is requested again or modified by the host system 105). At some later time, the data (e.g., the data as read, even if no modifications to the data were made while stored at the local memory 120) may be evited (e.g., flushed, erased) from the local memory 120 (e.g., in accordance with a cache policy for the local memory). In some cases, if the data is read from a first location (e.g., a first page 175) within a first group of memory cells (e.g., a first block 170) within a memory device 130, and a quantity of read operations performed at the first group of memory cells satisfies a threshold (e.g., is greater than or equal to an early relocation threshold), the data may be written back to a second location (e.g., a second page 175) within a second group of memory cells (e.g., a second block 170) either within the same memory device 130 or a different memory device 130. The copy of the data at the second location may become (e.g., be subsequently treated as) the valid copy of the data, and the copy of the data at the first location may become (e.g., be subsequently treated as) invalid. Alternatively, if the quantity of read operations performed at the first group of memory cells does not satisfy the threshold, and if no modification to the data was made while stored at the local memory 120, no additional write operation may be performed upon eviction of the data from the local memory 120, and the copy of the data at the first location may remain (e.g., be subsequently treated as) valid.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device. In such examples, memory device 130 may further include a buffer (not shown) to store data for subsequent retrieval for or manipulation (e.g., updating) by the host system 105 (e.g., with reduced latency relative to a memory device 130) in accordance with a cache policy. That is, a buffer as descried herein (e.g., with reference to the local memory 120) may alternatively be included within a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells. A collection of blocks 170 within a memory die 160 may be an example of a memory array. Hence, in some cases, a memory die 160 may alternatively represent a memory array, though in some cases, a memory die may include multiple memory arrays.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some examples, the memory system controller 115 may read data from one page 175 more frequently than a second page 175 (e.g., based on read commands received from the host system 105). For example, page 175-*a* may be read more frequently than page 175-*b*. In such examples, data read frequently from page 175-*a* (e.g., hot data) may be at a greater risk of being corrupted than data read less frequently (e.g., cold data). The memory system controller 115 may track a quantity of read operations performed at a block level of granularity—e.g., a quantity of read operations for the block 170-*a*, which may be incremented regardless of which page 175 within the block 170 is read. If a read operation causes a quantity of read operations at the block 170-*a* to satisfy an early relocation threshold value, the memory system controller 115 may transfer the data read from the block 170-*a* in connection with the read operation to a new block—e.g., to block 170-*b*. For example, the memory system controller 115 may write the data stored to local memory 120 as part of or otherwise in connection with the read operation, and based on the early relocation threshold value being satisfied for block 107-*a*, the memory system controller 115 may write the data (e.g., the original data or read or an updated version thereof as modified while stored at local memory 120) to block 170-*b*. Such behavior may generally result in the relocation of hot data. For example, though in some cases cold data may be relocated (e.g., based on a read command that causes the early relocation threshold to be satisfied happening to request cold data), over the lifetime of the memory system 110, it is statistically more likely that hot data will be requested in connection with read commands that cause the early relocation threshold to be satisfied.

In some cases, to update some data within a block 170 while retaining other data within the block 170, the memory device 130 may copy the data to be retained to a new block 170 and write the updated data to one or more remaining pages of the new block 170. In some examples, the memory system controller 115 or local controller 135-*a* may copy some of the data to a buffer (e.g., local memory 120) as part of a read operation received from the host system 105. In such examples, the memory device may write the data stored at the buffer to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent or otherwise operative version of such data being stored on the memory device 130. A page 175 that includes no data may be a page 175 that has never been written to or that has been erased. Hence, for example, based on relocating (e.g., transferring or moving) data from an old block 170-*a* to a new block 170-*b* based on satisfaction of the early relocation threshold for the old block 170-*a*, the memory system controller may update L2P tables to reflect that the version of the data stored at the new block 170-*b* is the valid copy, rendering the version of the data stored at the old block 170-*a* invalid.

In some cases, a memory system controller 115 or a local controller 135 may perform media management operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105). In some examples, the memory system controller 115 or local controller 135 may determine or adjust an early relocation threshold value based on how recently one or more media management operations have been performed, how soon one or more media management operations will be performed, or any combination thereof.

The system 100 may include any quantity of non-transitory computer readable media that support improved data management for memory. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
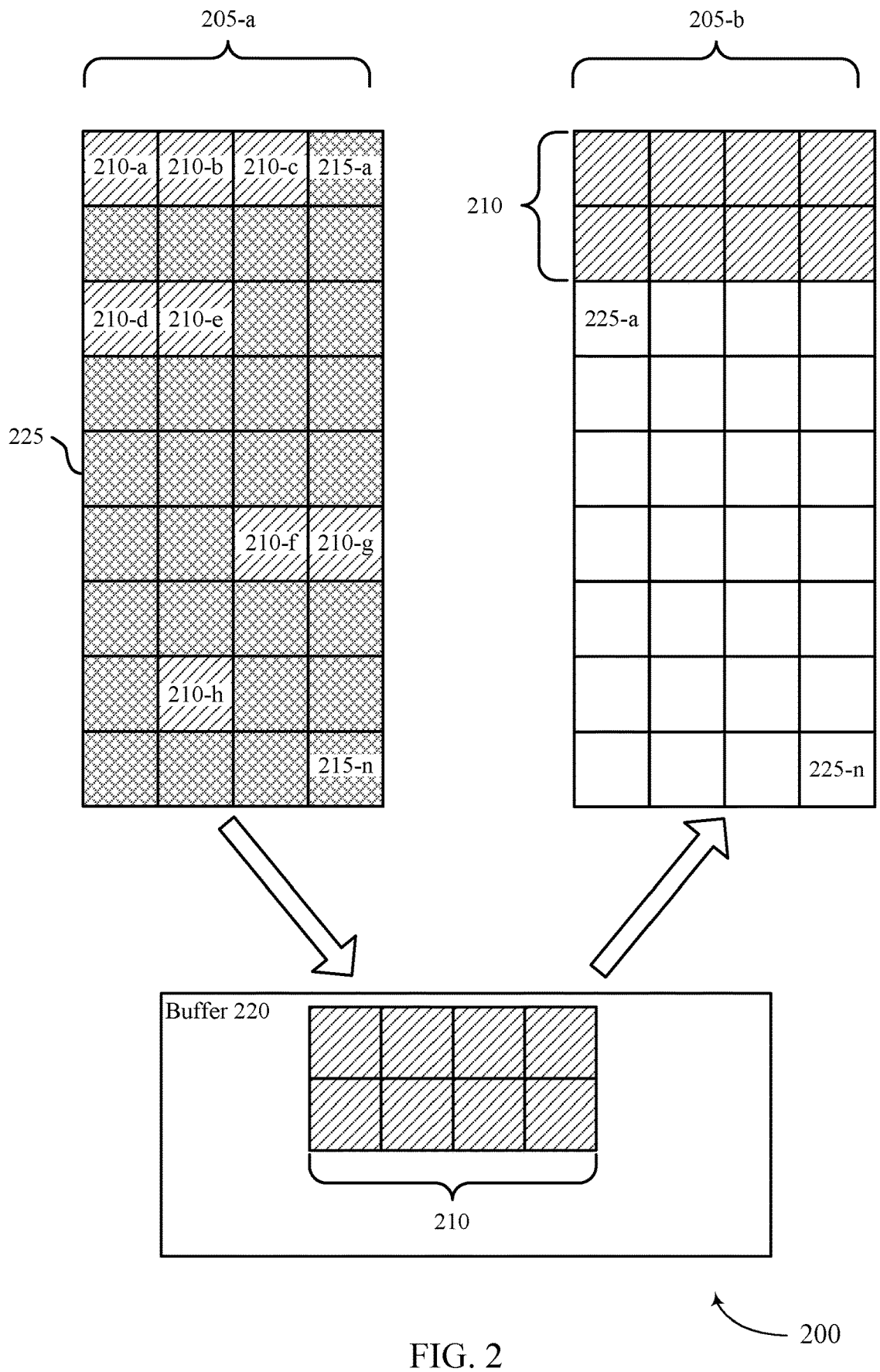
FIG. 2 illustrates an example of a memory system that supports improved data management for memory in accordance with examples as disclosed herein.

FIG. 2 illustrates an example of a memory system 200 that supports improved data management for memory in accordance with examples as disclosed herein. In some examples, the memory system 200 may be an example of memory system 110 as described with reference to FIG. 1. In some examples, the memory system 200 may include blocks 205-a and 205-b (e.g., which may be examples of blocks 170 as described with reference to FIG. 1) and a buffer 220 (e.g., which may be an example of local memory 120 as described with reference to FIG. 1). Although not shown, in some examples, the buffer 220 may be coupled with a host system (e.g., host system 105 as described with reference to FIG. 1) and each block 205 may be included in a memory array that is controlled by a controller (e.g., memory system controller 115 or local controller 135 as described with reference to FIG. 1).

Blocks 205 may each include a plurality of pages 225 (e.g., which may be examples of pages 175 as described with reference to FIG. 1) configured to store data. Some stored data may be hot data 210, and other stored data may be cold data 205. In some examples, blocks 205 may have free or available space—e.g., pages 225 that do not store data or pages 225 that store invalid data that may be erased and overwritten. For example, pages 225-a through pages 225-n of the block 205-b may be free space. In some examples, the memory system 200 may be configured to track a quantity of read operations performed at blocks 205—e.g., the memory system 200 may track the quantity of read operations at a block 205 level granularity and not at a page 225 level granularity.

Buffer 220 may be configured to serve as a cache for the memory system 200. For example, buffer 220 may store data read from blocks 205 that is to be transmitted to a host system (e.g., host system 105 as described with reference to FIG. 1). For example, while stored in buffer 220, data may be available for low latency retrieval if requested (e.g., repeatedly) by the host system, available for modification based on commands (e.g., write commands) from the host system, or any combination thereof. Additionally or alternatively, buffer 220 may store data received from the host system that is to later be written to the blocks 205. In some examples, buffer 220 may be located within a memory system controller (e.g., memory system controller 115). In other examples, buffer 220 may be located within a local controller (e.g., local controller 135). Buffer 220 may comprise volatile memory cells—e.g., RAM memory cells, such as SRAM memory cells.

In some examples, the host system may transmit read or write commands to the memory system 200. In such examples, the memory system 200 may perform read or write operations on the block 205. In some examples, the host system may request some data (e.g., hot data 210) more than other data (e.g., cold data 215) stored at blocks 205. For instance, hot data 210 may be preloaded or associated with an application or program that is frequently used in a system (e.g., system 100 as described with reference to FIG. 1), and the host system may request the hot data 210 frequently. In some cases, at least some hot data 210 may also be updated infrequently or not at all—e.g., such hot data 210 may be written once but read a high quantity of times.

In some examples, the data stored at a block 205 may be susceptible to corruption if a quantity of read operations at the block 205 exceeds a reliability threshold, which may, for example, be determined (e.g., empirically) during a design or manufacturing phase of memory system 200. That is the reliability threshold may be a predetermined quantity of reads operations for a block 205 above which a likelihood of data corruption is undesirably high for a given application.

In addition or as an alternative to such a reliability threshold (e.g., to further reduce a likelihood of data corruption), a memory system 200 may use an early relocation threshold as described herein. In some examples, the early relocation threshold value may be less than (e.g., below) the reliability threshold value. In some examples, the early relocation threshold value may be determined before the memory system 200 is operated (e.g., during a design or manufacturing phase of memory system 200), and the early relocation threshold value may be static while the memory system 200 is operating. In other examples, the early relocation threshold may be dynamic (e.g., configurable, adjustable) while memory system 200 is operating or in connection with an initialization (e.g., boot or reboot) of the memory system 200.

For example, the memory system 200 may determine (e.g., set, configure, adjust) the early relocation threshold value based on a logical saturation of the memory system 200—e.g., based on a quantity of blocks 205 or pages 225 free to store data. For example, the memory system 200 may determine a quantity of blocks 205 that store valid data. In such examples, the logical saturation may be based on a ratio of blocks 205 that store valid data to a total quantity of blocks 205 in the memory system 200. For instance, as a simplified numeric example, if the memory system 200 includes two (2) blocks 205 storing data and a total of ten (10) blocks, a logical saturation of the memory system may be twenty percent (20%). As one example, the memory system 200 may determine a relatively low early relocation threshold value based on a relatively low logical saturation—e.g., based on a high quantity of blocks 205 free to store data, as a greater quantity of free blocks 205 may support more frequent relocation, which may be compatible with a lower early relocation threshold and which may further boost reliability. As another example, the memory system 200 may determine a relatively high threshold value based on a relatively high logical saturation—e.g., based on a low quantity of blocks 205 free to store data, as a lower quantity of free blocks 205 may make frequent relocation less desirable, and hence may make a higher early relocation threshold desirable. In some cases, the memory system 200 may adjust (e.g., change or update) the early relocation threshold value based on a change in the logical saturation of the memory system 200. For example, the memory system 200 may receive a write command from the host system and store data at a block 205 that was previously free. Accordingly, the memory system 200 may have a higher logical saturation after the write operation. In such examples, the memory system 200 may adjust the early relocation threshold value based on the change in the logical saturation—e.g., the memory system 200 may increase the early relocation threshold value based on a higher logical saturation. Similarly, the memory system 200 may adjust the early relocation threshold value lower (e.g., decrease the early relocation threshold value) based on a block 205 being erased and becoming available for writing data thereto.

In other examples, the memory system 200 may determine the threshold value based on a media management operation (e.g., garbage collection or wear leveling operations) associated with the memory system 200. For example, if the memory system 200 frequently performs media management operations on blocks 205, the memory system 200 may determine a relatively high early relocation threshold value. That is, based on frequent garbage collection and wear leveling operations, data in blocks 205 may frequently be moved or erased from blocks 205, and a higher early relocation threshold value may be used as the likelihood of data being corrupted may be separately reduced based on the frequent media management operations. In other examples where the memory system 200 performs infrequent garbage collection or wear leveling operations, the memory system 200 may determine a relatively low early relocation threshold value.

As another example, if a garbage collection operation or wear leveling operation was recently performed (e.g., within some threshold amount of time) at block 205-a, will soon be performed (e.g., within some threshold amount of time) at block 205-a, or any combination thereof, the memory system 200 may adjust (e.g., decrease) the early relocation threshold value or temporarily disable the threshold value. In some examples the memory system 200 may determine an early relocation threshold value for all blocks 205 within a memory array. In other examples, the memory system 200 may determine a respective early relocation threshold value for each block 205 or for groups of blocks 205.

Based on an early relocation threshold value, the memory system 200 may determine whether to move (e.g., change the location of the valid version of the) data from block 205-a to a new block (e.g., block 205-b). For example, the memory system 200 may maintain, for each block 205, a respective counter that counts a quantity of read operations performed at the block 205, which may be referred to as a read counter—e.g., a first read counter for block 205-a, a second read counter for block 205-b, and so on for any quantity of additional blocks 205. The memory system 200 may update a value of the respective read counter each time a read operation associated with the corresponding block 205 is performed (e.g., each time a read command for data stored in the corresponding block 205 is received).

Each time the memory system increments the read counter for a block 205, the memory system 200 may then determine (e.g., evaluate, check) whether a value of the read counter for the block 205 satisfies (e.g., is greater than or equal to) the early relocation threshold value for the block 205. That is, the memory system 200 may determine whether a quantity of read operations performed at the block 205 satisfies the early relocation threshold value. If the quantity of read operations performed at the block 205 satisfies the early relocation threshold value, the memory system 200 may relocate at least some data from the block 205 to a new block 205. For example, the memory system 200 may write a new copy of the data associated with the most recent read operation for the block 205 to the new block 205. In some cases, in connection with reading data from a block 205, the memory system 200 may store the data for at least some period of time in the buffer 220, and the memory system 200 may relocate the data by writing the data from the buffer 220 to the new block 205 and by making (e.g., by updating one or more L2P tables) the resulting copy of the data at the new block 205 the valid version of the data rather than the version of the data at the block 205 from which the data was previously read (e.g., the version of the data at the block 205 from which the data was previously read may be made invalid, such as through the updating of the one or more L2P tables). In some examples, the memory system may similarly relocate any data read from the block 205 and present (e.g., stored) in the buffer 220 at the time of relocation to the new block 205 (e.g., if some data was read from the block 205 into the buffer 220 before the early relocation threshold value was satisfied, but such data remains in the buffer 220 once the early relocation threshold value has been satisfied, such data may also be relocated to the new block 205).

As an illustrative example, a read command received by the memory system 200 may be associated with hot data 210-h stored in block 205-a. The memory system 200 may read the hot data 210-h from the block 205-a and write the hot data 210-h to the buffer 220 in response to the read command. The memory system 200 may also determine that the early relocation threshold value for the block 205-a is satisfied based on reading the hot data 210-h from the block 205-a. In such examples, based on the early relocation threshold value being satisfied, memory system 200 may later write the hot data 210-h stored at the buffer 220 (which in some cases may have been modified or updated while stored at the buffer 220) to the block 205-b and make the version of the hot data 210-h written to the block 205-b the valid version thereof. The memory system 200 may thereby relocate the hot data 210-h from the block 205-a to the block 205-b. In an alternative scenario in which the early relocation threshold is not satisfied, the memory system 200 may maintain the version of the hot data 210-h previously read from the block 205-a as the valid version thereof, and the memory system 200 may not perform any additional write operation upon evicting the hot data 210-h from the buffer 220 (e.g., so long as the hot data 210-h also was not updated while stored in the buffer 220, as updating of hot data 210-h may cause the updated version of the hot data 210-h to instead be written to the block 205-b or some other block 205 upon eviction from the buffer 220, independent of whether the early relocation threshold is satisfied).

In some examples, hot data 210-a through hot data 210-g (that is, each of hot data 210-a, hot data 210-b, hot data 210-c, hot data 210-d, hot data 210-e, hot data 210-f, and hot data 210-g) may have been previously read from the block 205-a and may be in the buffer 220 based on prior read commands received by the memory system 200, and based on the early relocation threshold value being satisfied in connection with reading the hot data 210-h from the block 205-a, the memory system 200 may also write hot data 210-a through hot data 210-g to the block 205-b, rather than to the block 205-a. In some examples, the memory system may write the hot data 210-a through hot data 210-h to physically contiguous locations within the block 205-b—e.g., to physically contiguous pages 225 within the block 205-b, which may reduce a read latency associated with reading later reading hot data 210-a through hot data 210-h. For example, the memory system 200 may read data from physically contiguous locations lower latency compared to reading data from non-contiguous (e.g., random) locations.

As another illustrative example, the memory system 200 may determine that the early relocation threshold value for the block 205-a is satisfied based on reading hot data 210-a from the block 205-a. Accordingly, the memory system 200 may relocate the hot data 210-a to the block 205-b in accordance with examples as disclosed herein. After reading the hot data 210-a from the block 205-a, the memory system 200 may also read hot data 210-b through hot data 210-h (that is, each of hot data 210-b, hot data 210-c, hot data 210-d, hot data 210-e, hot data 210-f, hot data 210-g, and hot data 210-h) from the block 205-a. Based on the early relocation threshold having been previously satisfied in connection with reading the hot data 210-a, the memory system 200 may also relocate hot data 210-b through hot data 210-h to the block 205-b in accordance with examples as disclosed herein. Thus, hot data 210-b through hot data 210-h may each be relocated based on the early relocation threshold having been previously satisfied in connection with reading the hot data 210-a, in some cases regardless of whether hot data 210-b through hot data 210-h are in the buffer 2020 concurrently with each other or with the hot data 210-a. In some such examples, the memory system may write hot data 210-a through hot data 210-h to physically contiguous locations within the block 205-b.

In response to determining that the early relocation threshold value is satisfied for the block 205-a, the memory system 200 may relocate the most recently read data from block 205 (or in some cases, any data from the block 205-a that remains or becomes stored in the buffer 220 once the early relocation threshold value is satisfied for the block 205-a) regardless of whether such data is hot data 210 or cold data 215. Thus, in some examples, cold data 215 from may be relocated (e.g., from the block 205-a to the block 205-b). Over a relatively high quantity of read operations (e.g., millions or billions of read operations or over a lifetime of the memory system 200), however, the memory system 200 is statistically more likely to relocate hot data 210 based on an early relocation threshold than cold data 215. For example, the host system is more likely to issue read commands for the hot data 210 and thus the hot data 210 is more likely to be present in the buffer 220 at or after a time that the early relocation threshold value is satisfied. Additionally, any adverse impact on the performance of the memory system 200 by relatively infrequent transfers of cold data 215 may be minimal (e.g., negligible).

In some examples, the memory system 200 may determine that an early relocation threshold for a block 205 is satisfied based on reading a first set of data from the block 205, and the memory system 200 may relocate one or more additional sets of data from the block 205 (along with the first set of data) to a different block 205 based on a relationship between the first set of data and the one or more additional sets of data, regardless of whether the one or more additional sets of data are otherwise in the buffer 220 at a time that the relocation threshold for the block 205 is satisfied or thereafter. In some cases, the one or more additional sets of data may share a physical relationship with the first set of data. For example, the relocation threshold for the block 205-a may be satisfied based on reading hot data 210-c from the block 205-a, and the hot data 210-c may be relocated to the block 205-b along with one or more sets of data stored in one or more pages 225 that share at least one physical component (e.g., one or more access lines or other physical structures) with the page 225 storing the hot data 210-c (e.g., cold data 215-a, hot data 210-b, or some other set of data stored in a physically adjacent page 225 as the hot data 210-c may be relocated to the block 205-b).

Some memory systems 200 may, in addition to an early relocation threshold, employ a reliability threshold as described herein. The reliability threshold value may be higher than the early relocation threshold value (e.g., the reliability threshold for a block 205 may be satisfied after a greater quantity of read operations performed on the block 205 than the early relocation threshold). In response to the reliability threshold for a block 205 being satisfied, all valid data stored within the block 205 may be relocated to another block 205.

By writing data from the buffer 220 to a second block 205-b based on the early relocation threshold value being satisfied for the first block 205-a, the memory system 200 may reduce the likelihood of data being corrupted due to wearout of the first block 205-a. Further, by writing the data from buffer 220, the memory system 200 may avoid unnecessary additional read operations on block 205-a as related to the data. This may also reduce latencies in the memory system 200—e.g., reduce latencies associated with reading data from the block 205-a, which may be longer than writing the data directly from the buffer 220 to the second block 205-b. Additionally, by writing relocated sets of data to contiguous physical locations within the second block 205-b, the memory system 200 may decrease read latencies associated with subsequent read operations for the relocated data. Further, the memory system 200 may achieve these or other benefits without tracking read operations at a page 225 or other sub-block level of granularity—e.g., without consuming additional resources or introducing excessive overhead.

In some examples, a read counter for a block 205 may be reset (e.g., set to an initial value, such as zero) after (e.g., in response to) an erase operation being performed on the block 205. Thus, in some cases, a quantity of read operations performed at a block 205 for purposes of comparison with an early relocation threshold, a reliability threshold, or both may be a quantity of read operations performed at the block 205 since a most recent erase operation on the block 205.

Figure 3:
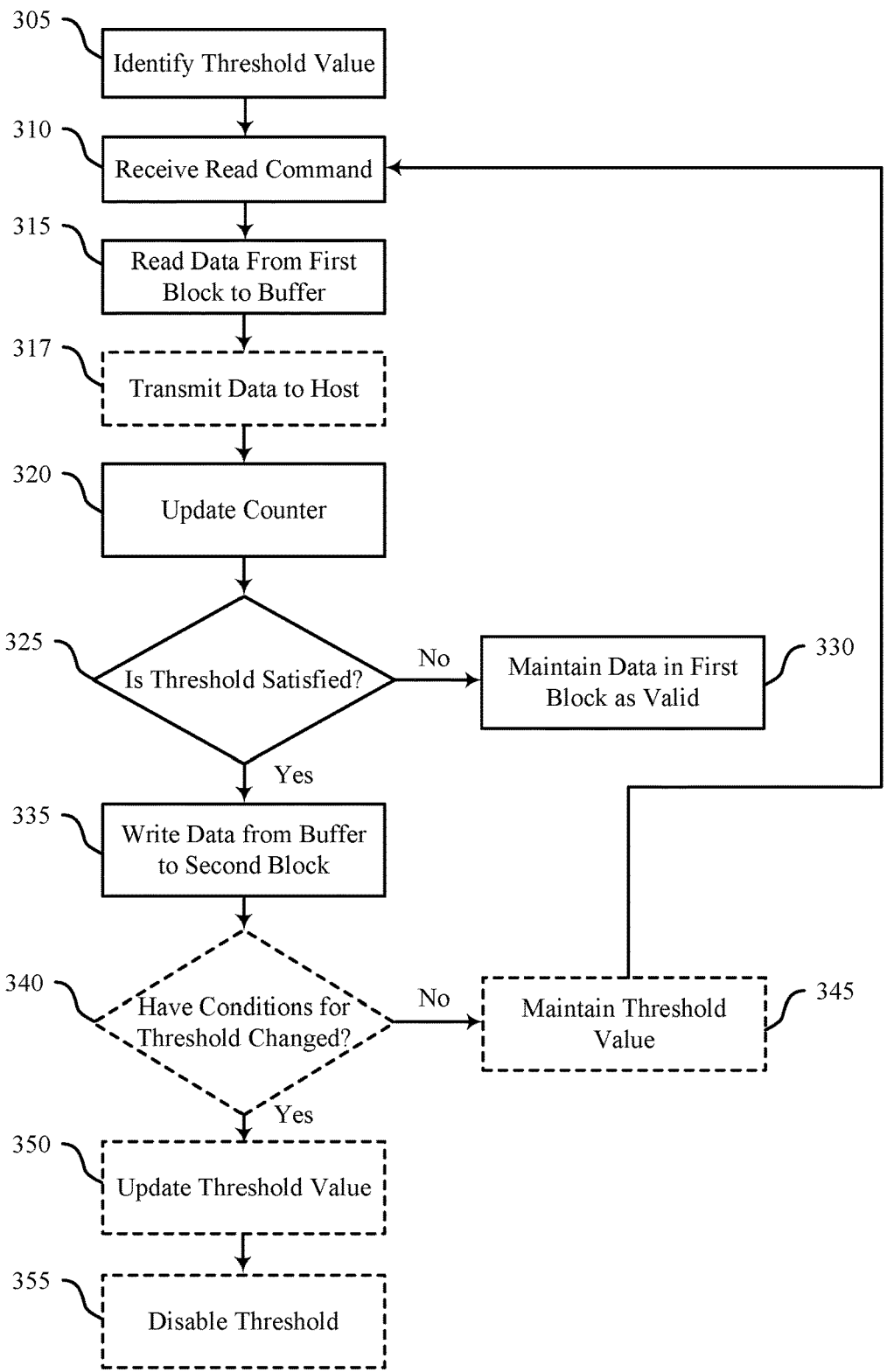
FIG. 3 illustrates an example of a process that supports improved data management for memory in accordance with examples as disclosed herein.

FIG. 3 illustrates an example of a process diagram 300 that supports improved data management for memory in accordance with examples as disclosed herein. The process diagram 300 illustrates an example process for relocating data stored at a first location to a buffer and then from the buffer to a second location based on a quantity of read operations performed at the first location satisfying an early relocation threshold. The process of process diagram 300 may be performed by a system and its components as described with reference to FIGS. 1 and 2 (e.g., a system 100 or a memory system 200). Aspects of the process may be implemented by a controller (e.g., a memory system controller 115), among other components. Additionally or alternatively, aspects of the process may be implemented as instructions stored in memory (e.g., firmware stored in a memory coupled with or included in a controller). For example, the instructions, when executed by a controller may cause the controller to perform the operations of the process.

Although shown in a particular sequence or order, unless otherwise specified, the order of operations of the process may be modified. Thus, the illustrated examples are used as examples, and the illustrated operations may be performed in a different order, and some operations may be performed in parallel. Additionally, one or more operations may be omitted or added in various examples.

At 305, a value of the early relocation threshold may be identified. For example, a memory system may identify the early relocation threshold value. The memory system (e.g., memory system controller 115 as described with reference to FIG. 1) may identify the early relocation threshold value based on a value stored at the memory system. For example, the early relocation threshold may be stored in a register (e.g., mode register) or otherwise configured at the memory system. In some cases, the early relocation threshold value may be dynamic, and the memory system may determine the early relocation threshold value (e.g., based on a logical saturation, a time since or until a media management operation, or any combination thereof), and identifying the early relocation threshold value may include or be based on such a determination.

At 310, a read command may be received. For example, the memory system may receive a read command from a host system (e.g., host system 105 as described with reference to FIG. 1). The read command may be received at a memory system controller (e.g., memory system controller 115 as described with reference to FIG. 1). The read command may be for data stored at a first block of memory cells within the memory system.

At 315, data may be read from the block of memory cells to a buffer (e.g., buffer 220 as described with reference to FIG. 2). For example, the memory system may read data from the first block to the buffer. In some examples, the read operation may be initiated by the memory system controller. In some examples, the memory system may read the data associated with the read command from the first block. In some cases, the memory system controller may store the data at the buffer for some duration after reading the data form the first block (e.g., based on a cache policy for the buffer).

In some examples, at 317, the memory system controller may transmit the data from the buffer to the host system to satisfy the read command. The buffer may act as a cache and store the data associated with read operations temporarily (e.g., until the data is evicted from the buffer in accordance with a cache policy, such as a first-in-first-out (FIFO) policy as one example).

At 320, a counter (e.g., a read counter) may be updated. For example, the memory system may update the counter. In some examples, the counter may be updated by the memory system controller. In some examples, the memory system may monitor (e.g., record or keep track of) a respective quantity of read operation performed at each block of memory cells within the memory system, such as by maintaining a respective counter for each block. In such examples, the memory system controller may update a counter associated with the first block based on receiving the read command at 310 or executing the read command at 315 (e.g., based on reading the data to the buffer). For example, the memory system controller may update a value of the counter from a first value to a second value.

At 325, whether the early relocation threshold is satisfied may be determined. For example, the memory system may determine whether the early relocation threshold is satisfied. The determination may be made by the memory system controller. In some examples (e.g., after updating the counter), the memory system controller may compare a value of the counter for the first block with the early relocation threshold value—e.g., compare a quantity of read operations performed at the first block with the value of the early relocation threshold. If the memory system controller determines that the counter value does not satisfy the early relocation threshold value, the memory system may proceed to 330. If the memory system controller determines that the counter value does satisfy the early relocation threshold value, the memory system may proceed to 335.

At 330, the data as read from and still stored at the first block may be maintained as valid based on (e.g., in response to) a determination at 325 that the counter value does not satisfy the early relocation threshold value. For example, the memory system may evict the data from the buffer without performing any additional write operation. The memory system controller may cause the memory system to maintain the version of the data at the first block as valid (e.g., by refraining from updating one or more associated L2P tables). In some examples, the memory system may evict the data from the buffer at some time based on a cache policy of the buffer (e.g., an eviction policy for the buffer, where data stored at the buffer may eventually be evicted from the buffer in accordance with the eviction policy).

It is to be understood that the data may in cases be updated while stored in the buffer (e.g., based one or more commands, such as write commands, received by the memory system from the host system). If the data is updated while stored in the buffer, the updated version of the data may be written to another block regardless of (e.g. independent of) whether the early relocation threshold is determined to be satisfied at 325. Thus, data at the first block that is maintained as valid at 330 may be identical to the data read from the first block at 315. Accordingly, the memory system controller may retain the data read at 315 and stored in the first block as the valid version thereof.

At 335, data may be written from the buffer to a second block of memory cells based on (e.g., in response to) a determination at 325 that the counter value does satisfy the early relocation threshold value (for example, even if the data was not updated while stored in the buffer—e.g., regardless of whether the data was updated while stored in the buffer). For example, the memory system may write the data from the buffer to the second block. The memory system controller may cause the memory system to write the data from the buffer to the second block. In some examples, the memory system may write the data from the buffer to the second block at some time based on a cache policy of the buffer, in like fashion as described with reference to 330. It is to be understood that the data may in cases be updated while stored in the buffer (e.g., based one or more commands, such as write commands, received by the memory system from the host system). Thus, the data written to the second block at 335 may be identical to the data read from the first block at 315 in some cases, though in other cases the data written to the second block at 335 may be an updated (e.g., modified) version of the data read from the first block at 315. The data written to the second block at 335 may be associated with the same logical address as the data read from the first block at 315 and thus may be considered the same data, even if one is an updated version of the other. Accordingly, the memory system controller may relocate the data read at 315 to the second block. The version of the data written to the second block at 335 may subsequently be treated as the valid copy of the data, and the version of the data previously read from the first block at 315 may subsequently be treated as invalid (e.g., one or more L2P tables may be updated to associate the version of the data written to the second block at 335 with the logical address for the data and to dissociate the version of the data previously read from the first block at 315 from the logical address for the data).

At 340, whether conditions for the early relocation threshold value have changed may be determined. For example, the memory system may determine whether one or more conditions for the early relocation threshold value have changed. In some examples, the determination may be made by the memory system controller. In some examples, after relocating the data at the first block or on some scheduled (e.g., periodic) basis, the memory system controller may check whether the conditions for the early relocation threshold value have changed. For example, the memory system controller may check whether a logical saturation has changed from a time at which the early relocation threshold value was previously determined—e.g., based on blocks being programmed or erased. The memory system controller may also check whether one or more media management operations (e.g., garbage collection or wear leveling operations) have occurred within a threshold amount of time or will occur within a threshold amount of time, or a frequency associated with such operations has been updated. If the memory system controller determines that one or more conditions for the early relocation threshold value have changed (e.g., have changed to a sufficient degree), the memory system may proceed to 350. If the memory system controller that conditions for the early relocation threshold value have not changed (or have changed to an insufficient degree), the memory system may proceed to 345.

At 345, the early relocation threshold value may be maintained based on (e.g., in response to) a determination at 340 that conditions for the early relocation threshold value have not changed (or have changed to an insufficient degree, such as by an insufficient amount). For example, the memory system may maintain the early relocation threshold value. The early relocation threshold value may be maintained by the memory system controller. In such examples, the memory system controller may use the maintained early relocation threshold value to determine whether the early relocation threshold is satisfied during a next iteration of the process at 325.

At 350, the threshold value may be adjusted or updated based on (e.g., in response to) a determination at 340 that conditions for the early relocation threshold value have changed (e.g., have changed to a sufficient degree, such as by a sufficient amount). For example, the memory system may adjust the early relocation threshold value. The adjustment may be done by the memory system controller. The adjustment may be of an early relocation threshold value specific to the first block or a group of blocks that includes the first block, or of an early relocation threshold value common to all blocks of the memory system, depending on whether the memory system uses one or multiple early relocation threshold values. For example, the memory system controller may decrease the early relocation threshold value based on a decrease in the logical saturation. In other examples, the memory system controller may increase the early relocation threshold value based on an increase in the logical saturation. Additionally or alternatively, memory system controller may also increase the early relocation threshold value based on a relatively recent or soon-upcoming media management (e.g., garbage collection or wear leveling) operation. In other cases, the memory system controller may decrease the early relocation threshold value based on a media management (e.g., garbage collection or wear leveling) operation not having been performed or not being planned to occur for a relatively long duration. In such examples, the memory system controller may use the updated early relocation threshold value to determine whether the early relocation threshold is satisfied during a next iteration of the process at 325.

In some examples, at 355, the early relocation threshold may be disabled based on (e.g., in response to) a determination at 340 that conditions for the early relocation threshold value have changed. For example, the early relocation threshold may be disabled if one or more conditions have changed to a large or otherwise sufficient degree, which may in some cases be a greater degree than would result in an update of the early relocation threshold value. The disablement may be of an early relocation threshold value specific to the first block or a group of blocks that includes the first block, or of an early relocation threshold value common to all blocks of the memory system, depending on whether the memory system uses one or multiple early relocation threshold values. In some examples, if the memory system controller disables the threshold value, the memory system controller may utilize a reliability threshold as described herein (e.g., a second threshold having a second threshold value) to determine whether to relocate all valid data stored at a block based on performing a subsequent read operation at the block. For example, if the memory system controller receives a second read command associated with the first block and updates the counter to a second value, the memory system controller may compare the second value with the reliability threshold value. If the second value satisfies the reliability threshold value, the memory system controller may relocate all valid data at the first block to the second block or some other block. If the second value does not satisfy the reliability threshold value, the memory system controller may refrain from relocating any data away from the first block.

Figure 4:
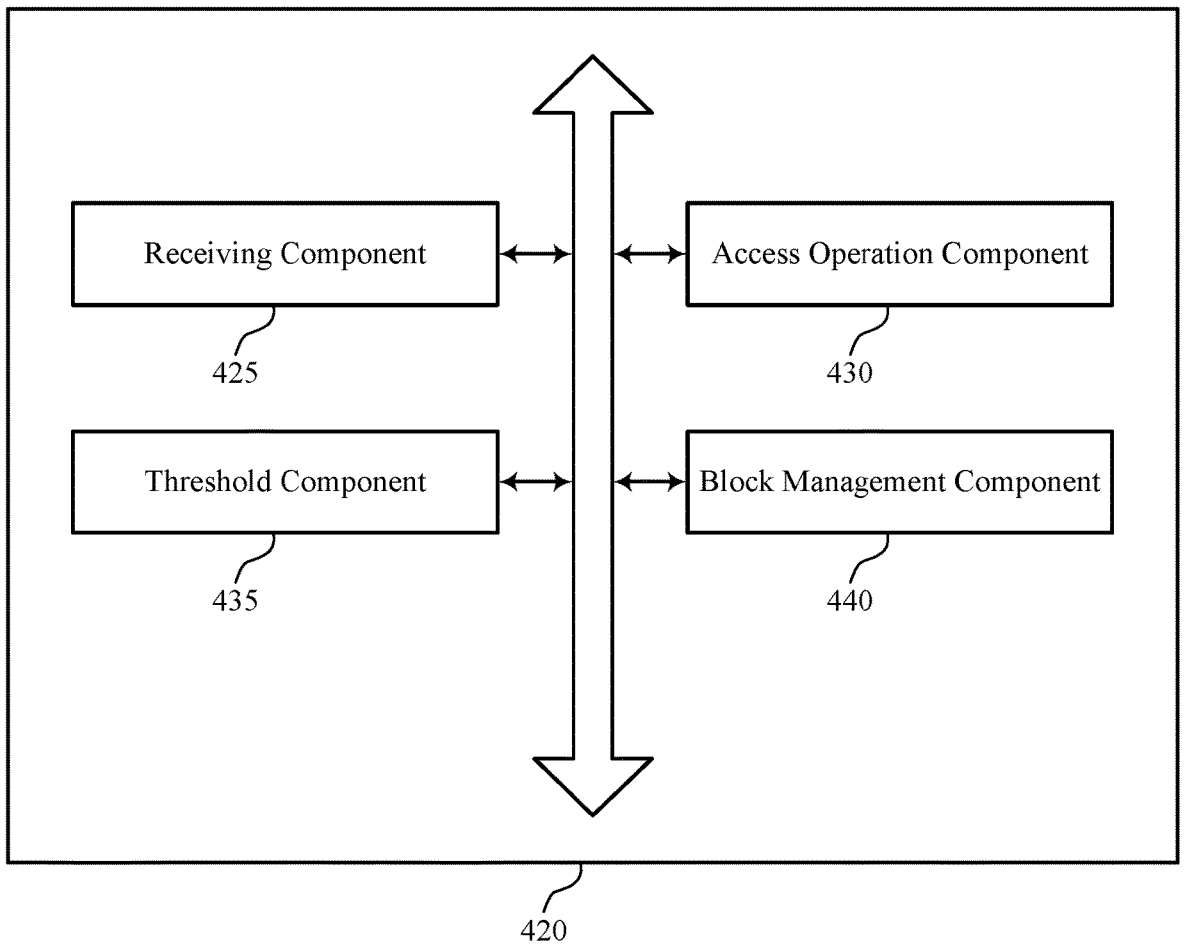
FIG. 4 shows a block diagram of a memory system that supports improved data management for memory in accordance with examples as disclosed herein.

FIG. 4 shows a block diagram 400 of a memory system 420 that supports improved data management for memory in accordance with examples as disclosed herein. The memory system 420 may be an example of aspects of a memory system as described with reference to FIGS. 1 through 3. The memory system 420, or various components thereof, may be an example of means for performing various aspects of improved data management for memory as described herein. For example, the memory system 420 may include a receiving component 425, an access operation component 430, a threshold component 435, a block management component 440, or any combination thereof. Each of these components may communicate, directly or indirectly, with one another (e.g., via one or more buses).

The receiving component 425 may be configured as or otherwise support a means for receiving, at a memory array including one or more blocks of memory cells, a read command associated with a subset of data stored at a first block of the one or more blocks. The access operation component 430 may be configured as or otherwise support a means for reading the subset of data from the first block to a buffer based at least in part on the receiving component 425 receiving the read command. The threshold component 435 may be configured as or otherwise support a means for determining, based at least in part on the receiving component 425 receiving the read command, whether a quantity of read operations performed at the first block satisfies a threshold value. In some examples, the access operation component 430 may be configured as or otherwise support a means for writing the subset of data from the buffer to a second block of the one or more blocks based at least in part on the threshold component 435 determining that the quantity of read operations performed at the first block satisfies the threshold value.

In some examples, the receiving component 425 may be configured as or otherwise support a means for receiving, after the read command, a second read command associated with the subset of data or a second subset of data stored at the first block. In some examples, the threshold component 435 may be configured as or otherwise support a means for determining, based at least in part on the receiving component 425 receiving the second read command, whether a second quantity of read commands performed at the first block satisfies a second threshold value. In some examples, the access operation component 430 may be configured as or otherwise support a means for writing all valid data stored at the first block to one or more other blocks included in the one or more blocks based at least in part on the threshold component 435 determining that the quantity of read operations performed at the first block satisfies the second threshold value. In some examples, the threshold value may be less than the second threshold value.

In some examples, the block management component 440 may be configured as or otherwise support a means for determining a quantity of blocks storing valid data within the one or more blocks. In some examples, the threshold component 435 may be configured as or otherwise support a means for determining, before the receiving component 425 receives the read command, the threshold value based at least in part on the quantity of blocks storing valid data within the one or more blocks.

In some examples, the block management component 440 may be configured as or otherwise support a means for determining an updated quantity of blocks storing valid data within the one or more blocks based at least in part on the access operation component 430 writing the subset of data to the second block. In some examples, the threshold component 435 may be configured as or otherwise support a means for adjusting the threshold value based at least in part on the updated quantity of blocks storing valid data within the one or more blocks.

In some examples, the threshold component 435 may be configured as or otherwise support a means for determining, before the receiving component 425 receives the read command, the threshold value based at least in part on a media management operation for the memory array.

In some examples, the receiving component 425 may be configured as or otherwise support a means for receiving a second read command associated with a second subset of data stored at a third block of the one or more blocks. In some examples, the access operation component 430 may be configured as or otherwise support a means for reading the second subset of data from the third block to the buffer based at least in part on the receiving component 425 receiving the second read command. In some examples, the threshold component 435 may be configured as or otherwise support a means for refraining from transferring data from the buffer to a fourth block of the one or more blocks despite a second quantity of read operations performed at the third block satisfying the threshold value, the refraining based at least in part on a media management operation performed for the one or more blocks before receiving the read command.

In some examples, the threshold component 435 may be configured as or otherwise support a means for initializing a counter. In some examples, the threshold component 435 may be configured as or otherwise support a means for updating the counter to a first value based at least in part on the receiving component 425 receiving the read command, where determining whether the quantity of read operations performed at the first block satisfies the threshold value is based at least in part on comparing the first value to the threshold value.

In some examples, to support writing the subset of data to the second block of the one or more blocks, the access operation component 430 may be configured as or otherwise support a means for writing the subset of data to a set of physically contiguous locations in the second block.

In some examples, the block management component 440 may be configured as or otherwise support a means for identifying, based at least in part on the threshold component 435 determining that the quantity of read operations performed at the first block satisfies the threshold value, a second subset of data at the first block and associated with the subset of data. In some examples, the access operation component 430 may be configured as or otherwise support a means for transferring the second subset of data from the first block to the second block based at least in part on the second subset of data being associated with the subset of data.

In some examples, the one or more blocks of memory cells may include non-volatile memory cells. In some examples, the buffer may include volatile memory cells.

Figure 5:
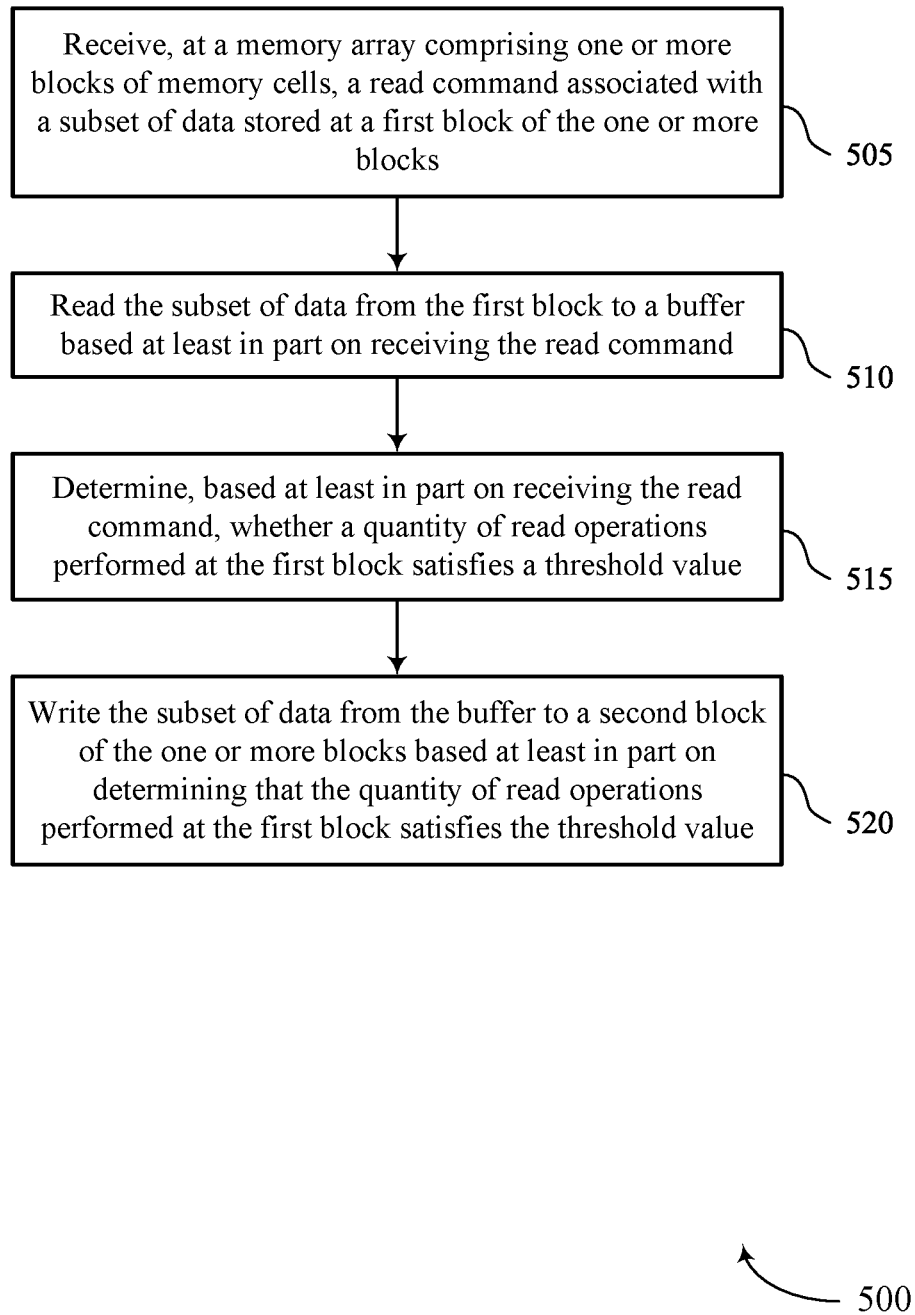
FIG. 5 shows a flowchart illustrating a method or methods that support improved data management for memory in accordance with examples as disclosed herein.

FIG. 5 shows a flowchart illustrating a method 500 that supports improved data management for memory in accordance with examples as disclosed herein. The operations of method 500 may be implemented by a memory system or its components as described herein. For example, the operations of method 500 may be performed by a memory system as described with reference to FIGS. 1 through 3 and 4. In some examples, a memory system may execute a set of instructions to control the functional elements of the device to perform the described functions. Additionally or alternatively, the memory system may perform aspects of the described functions using special-purpose hardware.

At 505, the method may include receiving, at a memory array including one or more blocks of memory cells, a read command associated with a subset of data stored at a first block of the one or more blocks. The operations of 505 may be performed in accordance with examples as disclosed herein. In some examples, aspects of the operations of 505 may be performed by a receiving component 425 as described with reference to FIG. 4.

At 510, the method may include reading the subset of data from the first block to a buffer based at least in part on receiving the read command. The operations of 510 may be performed in accordance with examples as disclosed herein. In some examples, aspects of the operations of 510 may be performed by an access operation component 430 as described with reference to FIG. 4.

At 515, the method may include determining, based at least in part on receiving the read command, whether a quantity of read operations performed at the first block satisfies a threshold value. The operations of 515 may be performed in accordance with examples as disclosed herein. In some examples, aspects of the operations of 515 may be performed by a threshold component 435 as described with reference to FIG. 4.

At 520, the method may include writing the subset of data from the buffer to a second block of the one or more blocks based at least in part on determining that the quantity of read operations performed at the first block satisfies the threshold value. The operations of 520 may be performed in accordance with examples as disclosed herein. In some examples, aspects of the operations of 520 may be performed by an access operation component 430 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving, at a memory array including one or more blocks of memory cells, a read command associated with a subset of data stored at a first block of the one or more blocks, reading the subset of data from the first block to a buffer based at least in part on receiving the read command, determining, based at least in part on receiving the read command, whether a quantity of read operations performed at the first block satisfies a threshold value, and writing the subset of data from the buffer to a second block of the one or more blocks based at least in part on determining that the quantity of read operations performed at the first block satisfies the threshold value.

Some examples of the method 500 and the apparatus described herein may further include operations, features, circuitry, logic, means, or instructions for receiving, after the read command, a second read command associated with the subset of data or a second subset of data stored at the first block, determining, based at least in part on receiving the second read command, whether a second quantity of read commands performed at the first block satisfies a second threshold value, and writing all valid data stored at the first block to one or more other blocks included in the one or more blocks based at least in part on determining that the quantity of read operations performed at the first block satisfies the second threshold value. In some examples of the method 500 and the apparatus described herein, the threshold value may be less than the second threshold value.

Some examples of the method 500 and the apparatus described herein may further include operations, features, circuitry, logic, means, or instructions for determining a quantity of blocks storing valid data within the one or more blocks and determining, before receiving the read command, the threshold value based at least in part on the quantity of blocks storing valid data within the one or more blocks.

Some examples of the method 500 and the apparatus described herein may further include operations, features, circuitry, logic, means, or instructions for determining an updated quantity of blocks storing valid data within the one or more blocks based at least in part on writing the subset of data to the second block and adjusting the threshold value based at least in part on the updated quantity of blocks storing valid data within the one or more blocks.

Some examples of the method 500 and the apparatus described herein may further include operations, features, circuitry, logic, means, or instructions for determining, before receiving the read command, the threshold value based at least in part on a media management operation for the memory array.

Some examples of the method 500 and the apparatus described herein may further include operations, features, circuitry, logic, means, or instructions for receiving a second read command associated with a second subset of data stored at a third block of the one or more blocks, reading the second subset of data from the third block to the buffer based at least in part on receiving the second read command, and refraining from transferring data from the buffer to a fourth block of the one or more blocks despite a second quantity of read operations performed at the third block satisfying the threshold value, the refraining based at least in part on a media management operation performed for the one or more blocks before receiving the read command.

Some examples of the method 500 and the apparatus described herein may further include operations, features, circuitry, logic, means, or instructions for initializing a counter and updating the counter to a first value based at least in part on receiving the read command, where determining whether the quantity of read operations performed at the first block satisfies the threshold value may be based at least in part on comparing the first value to the threshold value.

In some examples of the method 500 and the apparatus described herein, operations, features, circuitry, logic, means, or instructions for writing the subset of data to the second block of the one or more blocks may include operations, features, circuitry, logic, means, or instructions for writing the subset of data to a set of physically contiguous locations in the second block.

Some examples of the method 500 and the apparatus described herein may further include operations, features, circuitry, logic, means, or instructions for identifying, based at least in part on determining that the quantity of read operations performed at the first block satisfies the threshold value, a second subset of data at the first block and associated with the subset of data, and transferring the second subset of data from the first block to the second block based at least in part on the second subset of data being associated with the subset of data.

In some examples of the method 500 and the apparatus described herein, the one or more blocks of memory cells include non-volatile memory cells and the buffer includes volatile memory cells.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array including one or more blocks of memory cells and a for with the memory array. The controller may be configured to cause the apparatus to receive a read command associated with a subset of data stored at a first block of the one or more blocks, read the subset of data from the first block to a buffer based at least in part on receiving the read command, determine, based at least in part on receiving the read command, whether a quantity of read operations performed at the first block satisfies a threshold value, and write the subset of data from the buffer to a second block of the one or more blocks based at least in part on determining that the quantity of read operations performed at the first block satisfies the threshold value.

In some examples, the controller may be further configured to cause the apparatus to receive, after the read command, a second read command associated with the subset of data or a second subset of data stored at the first block, determine, based at least in part on receiving the second read command, whether a second quantity of read commands performed at the first block satisfies a second threshold value, and write all valid data stored at the first block to one or more other blocks included in the one or more blocks based at least in part on determining that the quantity of read operations performed at the first block satisfies the second threshold value. In some examples, the threshold value may be less than the second threshold value.

In some examples, the controller may be further configured to cause the apparatus to determine a quantity of blocks storing valid data within the one or more blocks and determine, before receiving the read command, the threshold value based at least in part on the quantity of blocks storing valid data within the one or more blocks.

In some examples, the controller may be further configured to cause the apparatus to determine an updated quantity of blocks storing valid data within the one or more blocks based at least in part on writing the subset of data to the second block and adjust the threshold value based at least in part on the updated quantity of blocks storing valid data within the one or more blocks.

In some examples, the controller may be further configured to cause the apparatus to determine, before receiving the read command, the threshold value based at least in part on a media management operation for the memory array.

In some examples, the controller may be further configured to cause the apparatus to receive a second read command associated with a second subset of data stored at a third block of the one or more blocks, read the second subset of data from the third block to the buffer based at least in part on receiving the second read command, and refrain from transferring data from the buffer to a fourth block of the one or more blocks despite a second quantity of read operations performed at the third block satisfying the threshold value, the refraining based at least in part on a media management operation performed for the one or more blocks before receiving the read command.

In some examples, the controller may be further configured to cause the apparatus to initialize a counter and update the counter to a first value based at least in part on receiving the read command, where determining whether the quantity of read operations performed at the first block satisfies the threshold value may be based at least in part on comparing the first value to the threshold value.

In some examples, to write the subset of data to the second block of the one or more blocks, the controller may be configured to cause the apparatus to write the subset of data to a set of physically contiguous locations in the second block.

In some examples, the controller may be further configured to cause the apparatus to identify, based at least in part on determining that the quantity of read operations performed at the first block satisfies the threshold value, a second subset of data at the first block and associated with the subset of data, and transfer the second subset of data from the first block to the second block based at least in part on the second subset of data being associated with the subset of data.

In some examples, the one or more blocks of memory cells include non-volatile memory cells, and the buffer includes volatile memory cells.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory array comprising one or more blocks of memory cells; and
   a controller for the memory array and configured to cause the apparatus to:
   receive a read command associated with a subset of data stored at a first block of the one or more blocks;
   read the subset of data from the first block to a buffer based at least in part on receiving the read command;
   determine, based at least in part on receiving the read command, whether a quantity of read operations performed at the first block satisfies a threshold value;
   write the subset of data from the buffer to a second block of the one or more blocks based at least in part on determining that the quantity of read operations performed at the first block satisfies the threshold value;
receive, after the read command, a second read command associated with the subset of data or a second subset of data stored at the first block;
determine, based at least in part on receiving the second read command, whether a second quantity of read commands performed at the first block satisfies a second threshold value; and
write all valid data stored at the first block to one or more other blocks included in the one or more blocks based at least in part on determining that the quantity of read operations performed at the first block satisfies the second threshold value.

2. The apparatus of claim 1, wherein the threshold value is less than the second threshold value.

3. The apparatus of claim 1, wherein the controller is further configured to cause the apparatus to:
determine a quantity of blocks storing valid data within the one or more blocks; and
determine, before receiving the read command, the threshold value based at least in part on the quantity of blocks storing valid data within the one or more blocks.

4. The apparatus of claim 3, wherein the controller is further configured to cause the apparatus to:
determine an updated quantity of blocks storing valid data within the one or more blocks based at least in part on writing the subset of data to the second block; and
adjust the threshold value based at least in part on the updated quantity of blocks storing valid data within the one or more blocks.

5. The apparatus of claim 1, wherein the controller is further configured to cause the apparatus to:
determine, before receiving the read command, the threshold value based at least in part on a media management operation for the memory array.

6. The apparatus of claim 1, wherein the controller is further configured to cause the apparatus to:
receive a second read command associated with a second subset of data stored at a third block of the one or more blocks;
read the second subset of data from the third block to the buffer based at least in part on receiving the second read command; and
refrain from transferring data from the buffer to a fourth block of the one or more blocks despite a second quantity of read operations performed at the third block satisfying the threshold value, the refraining based at least in part on a media management operation performed for the one or more blocks before receiving the read command.

7. The apparatus of claim 1, wherein the controller is further configured to cause the apparatus to:
initialize a counter; and
update the counter to a first value based at least in part on receiving the read command, wherein determining whether the quantity of read operations performed at the first block satisfies the threshold value is based at least in part on comparing the first value to the threshold value.

8. The apparatus of claim 1, wherein, to write the subset of data to the second block of the one or more blocks, the controller is configured to cause the apparatus to:
write the subset of data to a set of physically contiguous locations in the second block.

9. The apparatus of claim 1, wherein the controller is further configured to cause the apparatus to:
identify, based at least in part on determining that the quantity of read operations performed at the first block satisfies the threshold value, a second subset of data at the first block and associated with the subset of data; and
transfer the second subset of data from the first block to the second block based at least in part on the second subset of data being associated with the subset of data.

10. The apparatus of claim 1, wherein:
the one or more blocks of memory cells comprise non-volatile memory cells; and
the buffer comprises volatile memory cells.

11. A non-transitory computer-readable medium storing code comprising instructions, which when executed by a processor of an electronic device, cause the electronic device to:
receive, at a memory array comprising one or more blocks of memory cells, a read command associated with a subset of data stored at a first block of the one or more blocks;
read the subset of data from the first block to a buffer based at least in part on receiving the read command;
determine, based at least in part on receiving the read command, whether a quantity of read operations performed at the first block satisfies a threshold value;
write the subset of data from the buffer to a second block of the one or more blocks based at least in part on determining that the quantity of read operations performed at the first block satisfies the threshold value;
receive, after the read command, a second read command associated with the subset of data or a second subset of data stored at the first block;
determine, based at least in part on receiving the second read command, whether a second quantity of read commands performed at the first block satisfies a second threshold value; and
write all valid data stored at the first block to one or more other blocks included in the one or more blocks based at least in part on determining that the quantity of read operations performed at the first block satisfies the second threshold value.

12. The non-transitory computer-readable medium of claim 11, wherein the threshold value is less than the second threshold value.

13. The non-transitory computer-readable medium of claim 11, wherein the instructions, when executed by the processor of the electronic device, further cause the electronic device to:
determine a quantity of blocks storing valid data within the one or more blocks; and
determine, before receiving the read command, the threshold value based at least in part on the quantity of blocks storing valid data within the one or more blocks.

14. The non-transitory computer-readable medium of claim 13, wherein the instructions, when executed by the processor of the electronic device, further cause the electronic device to:
determine an updated quantity of blocks storing valid data within the one or more blocks based at least in part on writing the subset of data to the second block; and
adjust the threshold value based at least in part on the updated quantity of blocks storing valid data within the one or more blocks.

15. The non-transitory computer-readable medium of claim 11, wherein the instructions, when executed by the processor of the electronic device, further cause the electronic device to:
determine, before receiving the read command, the threshold value based at least in part on a media management operation for the memory array.

16. The non-transitory computer-readable medium of claim 11, wherein the instructions, when executed by the processor of the electronic device, further cause the electronic device to:
receive a second read command associated with a second subset of data stored at a third block of the one or more blocks;
read the second subset of data from the third block to the buffer based at least in part on receiving the second read command; and
refrain from transferring data from the buffer to a fourth block of the one or more blocks despite a second quantity of read operations performed at the third block satisfying the threshold value, the refraining based at least in part on a media management operation performed for the one or more blocks before receiving the read command.

17. The non-transitory computer-readable medium of claim 11, wherein the instructions, when executed by the processor of the electronic device, further cause the electronic device to:
initialize a counter; and
update the counter to a first value based at least in part on receiving the read command, wherein determining whether the quantity of read operations performed at the first block satisfies the threshold value is based at least in part on comparing the first value to the threshold value.

18. The non-transitory computer-readable medium of claim 11, wherein, to write the subset of data to the second block of the one or more blocks, the instructions, when executed by the processor of the electronic device, cause the electronic device to:
write the subset of data to a set of physically contiguous locations in the second block.

19. The non-transitory computer-readable medium of claim 11, wherein the instructions, when executed by the processor of the electronic device, further cause the electronic device to:
identify, based at least in part on determining that the quantity of read operations performed at the first block satisfies the threshold value, a second subset of data at the first block and associated with the subset of data; and
transfer the second subset of data from the first block to the second block based at least in part on the second subset of data being associated with the subset of data.

20. A method, comprising:
receiving, at a memory array comprising one or more blocks of memory cells, a read command associated with a subset of data stored at a first block of the one or more blocks;
reading the subset of data from the first block to a buffer based at least in part on receiving the read command;
determining, based at least in part on receiving the read command, whether a quantity of read operations performed at the first block satisfies a threshold value;
writing the subset of data from the buffer to a second block of the one or more blocks based at least in part on determining that the quantity of read operations performed at the first block satisfies the threshold value;
receiving, after the read command, a second read command associated with the subset of data or a second subset of data stored at the first block;
determining, based at least in part on receiving the second read command, whether a second quantity of read commands performed at the first block satisfies a second threshold value; and
writing all valid data stored at the first block to one or more other blocks included in the one or more blocks based at least in part on determining that the quantity of read operations performed at the first block satisfies the second threshold value.

21. The method of claim 20, wherein the threshold value is less than the second threshold value.

22. The method of claim 20, further comprising:
determining a quantity of blocks storing valid data within the one or more blocks; and
determining, before receiving the read command, the threshold value is based at least in part on the quantity of blocks storing valid data within the one or more blocks.

* * * * *